United States Patent [19]
Reinsch et al.

[11] 3,753,613
[45] Aug. 21, 1973

[54] MOTION PICTURE CAMERA WITH ADJUSTABLE SHUTTER MEANS

[75] Inventors: Herbert Reinsch, Kongen; Gottfried Kühne, Birkmannsweiler; Wolf Schirmer, Stuttgart, all of Germany

[73] Assignee: Robert Bosch Photokino GmbH, Stuttgart, Germany

[22] Filed: Feb. 24, 1972

[21] Appl. No.: 228,872

[30] Foreign Application Priority Data
Mar. 8, 1971   Germany.................... P 21 10 923.9

[52] U.S. Cl.................... 352/121, 352/137, 352/169
[51] Int. Cl. ............................................ G03b 17/46
[58] Field of Search...................... 352/121, 84, 137, 352/169; 95/31 EL, 53 EA

[56] References Cited
UNITED STATES PATENTS

| | | | |
|---|---|---|---|
| 3,603,678 | 9/1971 | Anderl................................ | 352/169 |
| 3,526,181 | 9/1970 | Fahlenberg........................ | 95/53 EA |
| 3,434,405 | 3/1969 | Friedman........................ | 95/31 EL X |
| R26,627 | 7/1969 | Burgarella..................... | 95/53 EB X |

Primary Examiner—Samuel S. Matthews
Assistant Examiner—Monroe H. Hayes
Attorney—Michael S. Striker

[57] ABSTRACT

A motion picture camera wherein a rotary shutter is movable between first and second angular positions in which its blade respectively overlies and is out of register with the light-admitting aperture. An adjustable first pulse generator is provided to effect movements of the shutter from the first to the second position at preselected intervals to thereby start exposure with long exposure times. A second pulse generator is activated when the shutter assumes its second position and effects a movement of the shutter back to the first position with a delay which is a function of scene brightness but is invariably shorter than a preselected interval. The two pulse generators control a two-way switch which can cause an electromagnet to disengage an intercepting lever from the shutter whereby the lever starts the motor which rotates the shutter from the first to the second position when the switch is actuated by the first pulse generator and from the second to the first position when the switch is actuated by the second pulse generator.

12 Claims, 1 Drawing Figure

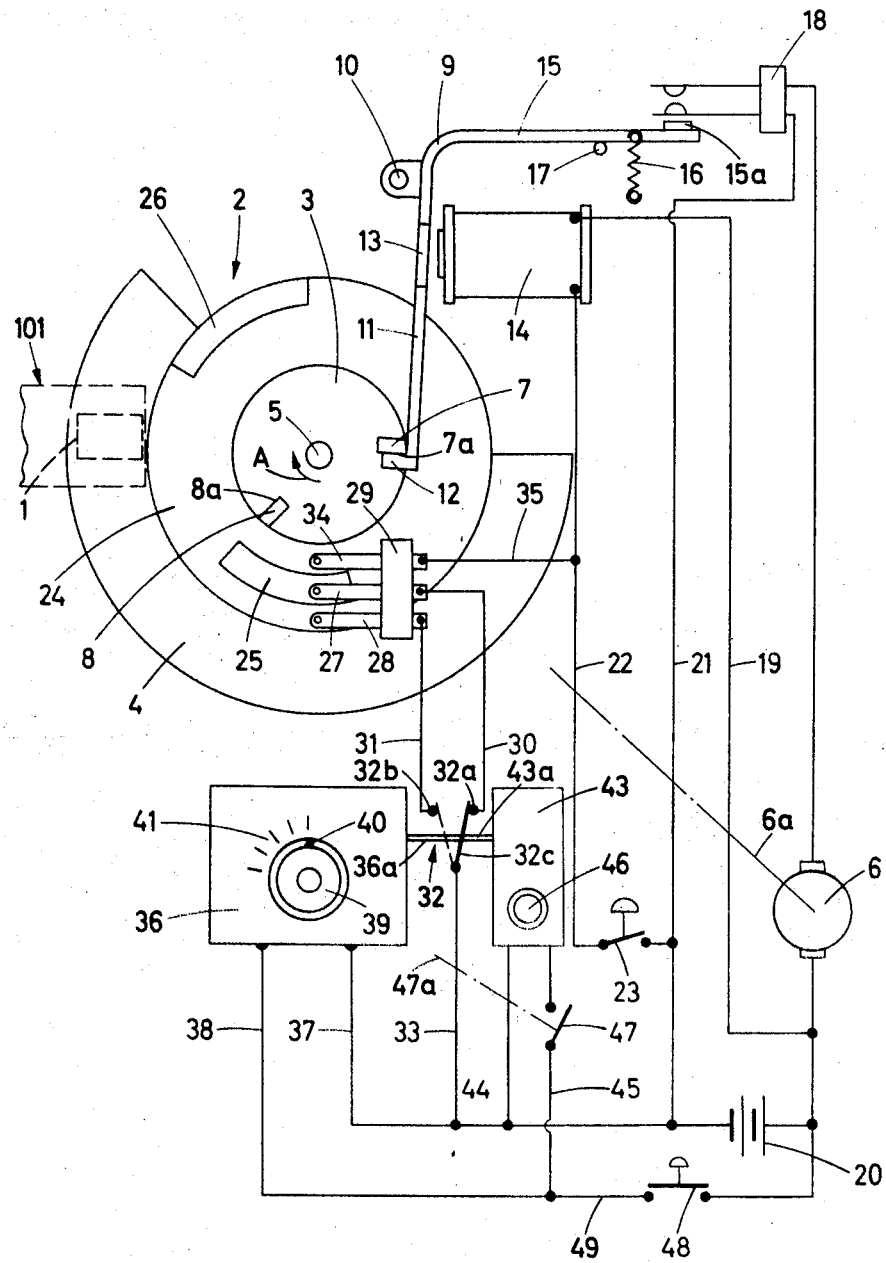

MOTION PICTURE CAMERA WITH ADJUSTABLE SHUTTER MEANS

BACKGROUND OF THE INVENTION

The present invention relates to improvements in cinematographic apparatus in general, and more particularly to improvements in motion picture cameras with adjustable shutters. Still more particularly, the invention relates to improvements in motion picture cameras of the type wherein a preferably rotary shutter can be arrested in two different positions in one of which its blade or blades overlie the light-admitting aperture for film frames and in the other of which the blade or blades are out of register with such aperture so that the film frame behind the aperture is exposed to scene light while the shutter is idle. Such motion picture cameras can be used for the making of regular or short exposures with predetermined exposure times which are being made while the shutter is in motion as well as for the making of longer exposures which are being made while the shutter is at a standstill.

German printed publication No. 2,002,699 discloses a motion picture camera wherein the shutter can be caused to assume an open position immediately upon completed transport of motion picture film by the length of a frame and to remain in open position until the film transporting mechanism receives an impulse to advance the film so as to place a fresh unexposed film frame into register with the light-admitting aperture. This enables the user to make exposures with desired exposure times simply by maintaining the shutter in its open position for as long as is deemed necessary in view of the prevailing scene brightness. Exposures with relatively long exposure times are often necessary when the pictures are taken in twilight or at night with artificial illumination of a subject or scene. The just discussed camera is further provided with a single pulse generator which saves the user the work of periodically actuating the camera release. To this end, the pulse generator furnishes impulses at a predetermined frequency and such impulses are capable of effecting a forward transport of the film. The pulse generator is an electronic timer device whose impulses serve to start the film transporting mechanism at regular intervals and to thereupon start a long exposure by causing the shutter to open. The next impulse causes the shutter to close, the film transporting mechanism to advance the film by the length of a frame, and the shutter to open again to thereby start the next long exposure. A drawback of such cameras is that each of a series of successive exposures is of identical length unless the user decides to adjust the pulse generator so that the latter furnishes impulses at shorter or longer intervals. This means that when the scene brightness is likely to change, the user must be on the alert during the making of a large number of successive exposures in order to make sure that each exposure or each relatively short series of exposures will be made with the optimum exposure time. For example, the exposure times will normally be shorter at or immediately after sundown but should be longer as the darkness increases and longest when made at night exclusively with artificial illumination of the subject or scene. Therefore, the exposure of all frames on a motion picture film can take several hours. In other words, the user often watches the subject or scene for extremely long periods of time and must be constantly on the alert to properly adjust the pulse generator if the scene brightness and/or the nature of light which illuminates the subject or scene is about to change. If the user sets the pulse generator in such a way that the latter furnishes impulses at relatively short intervals and the user thereupon fails to pay attention to the camera, the camera is likely to make an excessive number of exposures within a short period of time or to make exposures with exposure times which are too short or too long, depending upon whether the scene brightness decreases or increases. Inversely, if the pulse generator is set to furnish impulses at very long intervals, the exposure times might be too long if the scene brightness increases while the camera remains unattended. In each instance, the user wastes substantial amounts of motion picture film and might be deprived of the opportunity to take a series of unique pictures.

Relatively long exposures are made not only for the taking pictures of stationary objects, such as poorly or artificially illuminated buildings, monuments or the like, but also for the taking of pictures of slowly moving objects when the scene brightness is unsatisfactory for the making of relatively short exposures with predetermined exposure times, e.g., 1/30 second. The pictures of slowly moving objects which are taken with presently known cameras exhibit the drawback that, when the images are projected onto a screen or the like, the movements of the slowly moving object appear to be unnatural if the film contains groups of frames which are exposed at different frequencies per unit of time. When the images of frames on such film are projected, the object appears to move at times slowly and at times at a higher speed, depending upon whether the respective frames were exposed at a higher or lower frequency.

SUMMARY OF THE INVENTION

An object of the invention is to provide a novel and improved motion picture camera embodying an adjustable shutter which is capable of making long exposures in such a way that the changes in scene brightness during the making of exposures with long exposure times do not influence the frequency at which the frames of the motion picture film are exposed.

Another object of the invention is to provide the camera with novel and improved means for regulating the exposure times during the making of long exposures as a function of scene brightness.

A further object of the invention is to provide a motion picture camera wherein the conversion from making of long exposures to making of normal or short exposures is a simple and time-saving operation.

An additional object of the invention is to provide a motion picture camera with novel means for terminating exposures with long exposure times.

The invention resides in the provision of a motion picture camera for the making of exposures with short exposure times of predetermined duration and longer exposure times of variable duration. The camera comprises means defining a light-admitting aperture through which scene light can reach unexposed film frames, a shutter preferably rotary, having blade means and being movable between and beyond first and second positions in which the blade means respectively overlies and is out of register with the aperture, drive means which preferably includes an electric motor and transmission means for moving the shutter when the motor is on, first pulse generator means which is actuatable to effect movements of the shutter from the first to the second position at predetermined first intervals whose duration is preferably adjustable by the user of the camera, and second pulse generator means which is actuatable to effect movements of the shutter back to the first position at variable second intervals each of which is shorter than a first interval. A long exposure is started when the first pulse generator means causes the shutter to move from the first position (in which the blade means overlies the light-admitting aperture) to the second position (in which the blade means is out of register with an unexposed film frame behind the aperture), and such long exposure is terminated before the elapse of a first interval, namely, with a delay which is started with the movement of the shutter to its second position and whose duration corresponds to one of the second intervals.

The camera may comprise a main switch or a like means for actuating the second and/or first pulse generator means at the will of the user.

The second pulse generator means preferably includes exposure control means having photosensitive means for determining the duration of second intervals as a function of scene brightness. The second pulse generator means preferably further includes an electromagnet or analogous means for effecting a movement of the shutter from the second position back to the first position with a delay which is determined by the photosensitive means as a function of scene brightness. The camera preferably further comprises a cam-and-follower assembly (whose cam can be mounted on and shares the movements of the shutter) serving to activate the second pulse generator means in response to movement of the shutter to its second position as a result of a pulse furnished by the first pulse generator means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary diagrammatic view of a motion picture camera with adjustable shutter means which embodies the invention.

DESCRIPTION OF THE PREFERRED EMBODIMENTS

The illustrated motion picture camera comprises a housing including a wall or partition 101 which defines a light-admitting aperture 1. This aperture is located in front of the path of motion picture film (not shown) and behind the plane of the blade 4 of a rotary shutter 2. The latter further comprises a hub 3 which is secured to a shaft 5 and supports the blade 4. The shaft 5 can be rotated by a drive means including an electric motor 6 and a step-down transmission 6a which is indicated by a phantom line. The shutter 2 is arranged to rotate in a clockwise direction as indicated by the arrow A. The shaft 5 further supports a system of cams (not shown) which transmit motion to a conventional film feeding mechanism preferably including a claw pulldown which serves to transport the film behind the aperture 1 in stepwise fashion so as to place a fresh film frame into register with the aperture in response to each revolution of the shaft 5. The arrangement is such that the transport of motion picture film takes place while the blade 4 overlies the aperture 1 and that the film is at a standstill when the blade 4 is out of register with the aperture.

The hub 3 of the shutter 2 is provided with two angularly offset portions of projections 7 and 8 having front end faces 7a, 8a located in a common plane which is normal to the axis of the shaft 5. These projections cooperate with the bent-over portion or tooth 12 of a two-armed intercepting or arresting lever 9 which is pivotable on a pin 10 of the camera body and is permantly biased to the illustrated operative position by a helical spring 16. The portion or tooth 12 is provided on a first arm 11 and the spring 16 engages a second arm 15 of the intercepting lever 9. The displacing means for pivoting the intercepting lever 9 to a retracted or inoperative position (in which the tooth 12 is withdrawn from the path of orbital movement of surfaces 7a, 8a on the projections 7, 8) includes an electromagnet 14 having a plate-like armature 13 mounted on or forming part of the arm 11. When the lever 9 is allowed to dwell in the illustrated operative position under the action of the spring 16, its arm 15 abuts against a stop pin 17 in the camera body. The end portion 15a of the arm 15 constitutes an arresting means for the motor 6 as well as a trip which automatically closes a normally open starter switch 18 in the circuit of the motor 6 when the electromagnet 14 is energized to pivot the intercepting lever 9 to its inoperative position. The trip 15a constitutes an arresting means becaust it causes the switch 18 to arrest the motor when the intercepting lever 9 is allowed to assume its operative position.

One pole of a battery 20 or an analogous source of electrical energy is connected with the electromagnet 14 by way of a conductor 19. A second conductor 21 connects the other pole of the energy source 20 with one contact of the starter switch 18. A third conductor 22 is connected with the electromagnet 14 and can be connected with the other pole of the energy source 20 in response to closing of a normally open master switch 23 which is installed between the conductors 21 and 22.

When the camera is not in use, the shutter 2 assumes a first angular position which is shown in the drawing and in which the tooth 12 of the intercepting lever 9 (in deenergized condition of the electromagnet 14) is engaged by the front surface 7a of the projection 7. The blade 4 overlies the light-admitting aperture 1 so that the foremost film frame which registers with the aperture 1 cannot be reached by scene light.

If the user of the camera wishes to make a series of exposures with short exposure times (e.g., 1/30 second), the master switch 23 is closed to thereby energize the electromagnet 14 which attracts its armature 13 and pivots the intercepting lever 9 to its inoperative position against the opposition of the spring 16. The tooth 12 is thereby withdrawn from the path of the surface 7a on the projection 7 and the end portion 15a of the arm 15 closes the starter switch 18 which completes the circuit of the motor 6 so that the transmission 6a drives the shaft 5 and rotates the shutter 2 in a clockwise direction (arrow A). The shaft 5 causes the aforementioned claw pull-down to transport the motion picture film behind the aperture 1 when the aperture is overlapped by the blade 4 and the foremost unexposed film frame which registers with the aperture 1 is exposed to scene light when the blade 4 is out of register with the aperture.

If the user thereupon decides to terminate the making of exposures with short exposure times, the master switch 23 is caused or allowed to open whereby the electromagnet 14 is deenergized but always in the illustrated first angular position of the shutter 2, namely, when the blade 4 overlies the light-admitting aperture 1. This is due to the provision of a control unit which allows a deenergization of the electromagnet 14 in a selected one of two predetermined angular positions of the shutter 2, namely, in the illustrated first position in which, as a result of deenergization of the electromagnet 14, the spring 16 is free to move the tooth 12 into the path of the surface 7a on the oncoming or approaching projection 7 and in a second angular position in which the spring 16 can move the tooth 12 into the path of the surface 8a on the oncoming projection 8 to intercept the shutter 2 in a position in which the aperture 1 is not overlapped by the blade 4 so that the unexposed film frame behind the aperture receives scene light for as long as the shutter 2 remains idle.

The control unit comprises a disk-shaped contact plate 24 which is mounted at the front end of the hub 3 and rotates with the shutter 2 when the motor 6 is on. The contact plate 24 is provided with two angularly offset insulating portions 25, 26 (hereinafter called insulators) which are located at different distances from the axis of the shaft 5. The illustrated side of the contact plate 24 is tracked by three fixed elastic contacts 27, 28, 34. The contact 27 is engaged by the insulator 25 in the first angular position of the shutter 2 (when the blade 4 overlies the aperture 1) and the contact 28 is engaged by the insulator 26 in the second angular position of the shutter (when the blade 4 is out of register with the aperture 1). The contacts 27, 28, 34 are mounted in a stationary carrier 29 of insulating material. The contact 34 tracks the plate 24 radially inwardly of the insulator 25 and is connected with the conductor 22 by way of a conductor 35. The control unit further comprises a two-way switch 32 having two stationary contacts 32a, 32b which are respectively connected with the fixed contacts 27, 28 by way of conductors 30, 31 and a movable contact 32c which is connected with the other pole of the energy source 20 by a conductor 33. It will be seen that the plate 24 and the fixed contact 34 are permanently connected in the circuit of the electromagnet 14 and that the fixed contact 27 or 28 can be connected into such circuit, depending on the selected position of the movable contact 32c, namely, whether the user wishes to make a series of exposures with short exposure times (the movable contact 32c then engages the stationary contact 32a) or a series of exposures with long exposure times (the movable contact 32c then engages the stationary contact 32b). The elements of the just described control unit render it possible to automatically arrest the shutter 2 in the illustrated first angular position when the movable contact 32c dwells in the solid-line first position even if the user of the camera allows or causes the master switch 23 to open at a time when the tooth 12 would enter the path of the surface 8a on the projection 8 were the electromagnet 14 deenergized in immediate response to opening of the master switch 23, or to automatically arrest the shutter in the second angular position in which the blade 4 does not overlie the aperture 1 provided that the movable contact 32c then assumes its broken-line second position in which it engages the stationary contact 32b.

If the user wishes to terminate the making of exposures with short exposure times (during which the movable contact 32c engages the stationary contact 32a and the user maintains the master switch 23 in the closed position), the switch 23 is allowed or caused to open so as to interrupt the flow of electric current between the conductor 22 and the other pole of the energy source 20. However, the electromagnet 14 remains energized (unless the master switch 23 opens at the exact moment when the fixed contact 27 is engaged by the insulator 25) because its circuit remains completed by way of the conductor 19, energy source 20, conductor 33, contacts 32c, 32a of the two-way switch 32, conductor 30, fixed contact 27, contact plate 24, fixed contact 34, conductor 35 and conductor 22. The electromagnet 14 is deenergized when the leading end of the insulator 25 reaches the fixed contact 27 because the insulator 25 then interrupts the flow of electric current between the conductors 30 and 35. The spring 16 is free to contract in automatic response to deenergization of the electromagnet 14 so that the arm 15 moves into abutment with the stop pin 17 and the tooth 12 of the arm 11 enters the path of the surface 7a on the oncoming projection 7. The inertia of moving parts causes the shutter 2 to rotate in the direction indicated by the arrow A until the surface 7a actually engages the tooth 12. The starter switch 18 opens automatically when the intercepting lever 9 assumes the illustrated operative position so that the motor 6 is arrested and ceases to transmit torque to the shaft 5.

If the user wishes to take pictures with long exposure times, the movable contact 32c of the two-way switch 32 is moved to the broken-line second position in which it engages the stationary contact 32b whereby the electromagnet 14 is energized because its circuit is completed by way of the conductor 19, energy source 20, conductor 33, contacts 32c, 32b, conductor 31, fixed contact 28 (which then engages the contact plate 24), contact plate 24, fixed contact 34 and conductors 35, 22. Thus, the electromagnet 14 attracts its armature 13 to pivot the intercepting lever 9 to its inoperative position so that the trip 15a closes the switch 18 in order to start the motor 6 and the tooth 12 is retracted from the path of the surface 7a on the projection 7. The shaft 5 completes about one-half of a revolution when the leading end of the insulator 26 engages the fixed contact 28. The electromagnet 14 is deenergized because the insulator 26 interrupts the flow of electric current between the conductors 31, 35 and the spring 16 immediately returns the intercepting lever 9 to its operative position in which the tooth 12 extends into the path of the surface 8a on the oncoming projection 8. The circuit of the motor 6 is interrupted because the trip 15a allows the starter switch 18 to open as soon as the intercepting lever 9 assumes its operative position. However, the inertia of moving parts causes the shutter 2 to rotate until the tooth 12 is actually engaged by the surface 8a of the projection 8. The blade 4 is out of register with the aperture 1 so that the foremost unexposed film frame (which has been moved into alignment with the aperture 1 during rotation of the shutter 2 in response to movement of the movable contact 32c to its broken-line second position) receives scene light for as long as the shutter 2 remains at a standstill in the second angular position, i.e., in that position in which the fixed contact 28 bears against the insulator 26 of the contact plate 24.

In order to terminate a long exposure, the user returns the movable contact 32c of the two-way switch 32 to the solid-line first position to thereby complete the circuit of the electromagnet 14 by way of the conductor 19, energy source 20, conductor 33, contacts 32c, 32a of the two-way switch 32, conductor 30, fixed contact 27 (which then engages the contact plate 24), contact plate 24, fixed contact 34, and conductors 35, 22. The energized electromagnet 14 pivots the intercepting lever 9 to its inoperative position so that the tooth 12 is retracted from the path of the surface 8a on the projection 8 and the trip 15a closes the switch 18 to start the motor 6 which rotates the shutter 2 whereby the blade 4 begins to overlie the aperture 1 and thereby terminates a long exposure. The electromagnet 14 is deenergized shortly before the shutter 2 reaches the illustrated first angular position because the leading end of the insulator 25 then engages the fixed contact 27 to interrupt the flow of electric current between the conductors 30 and 35. The circuit of the motor 6 is interrupted because the starter switch 18 opens in immediate response to movement of the intercepting lever 9 to its operative position but the inertia of moving parts causes the shutter 2 to rotate until the surface 7a of the projection 7 arrives at and is arrested by the tooth 12.

The next long exposure is started by the user in response to movement of the contact 32c to the broken-line second position, and such next long exposure is terminated in response to renewed movement of the contact 32c to the solid-line first position. In order to spare the user the work of repeatedly moving the contact 32c to the broken-line second position, the motion picture camera further comprises an electro-mechanical or electronic first pulse generator 36 which includes an electromagnet or an analogous servomotor having moving means 36a (e.g., an armature) capable of automatically moving the contact 32c of the two-way switch 32 to the broken-line second position at predetermined first intervals to thus start a series of long exposures. The provision of the pulse generator 36 is particularly desirable when the user wishes to make a large number of successive long exposures, i.e., to repeatedly cause the contact 32c to move to the broken-line second position and to thereby start successive long exposures. The pulse generator 36 is connected with the two poles of the energy source 20 by conductors 37, 38 and its casing carries a rotary adjusting knob 39 which is provided with an index 40 movable along a stationary scale 41 whose graduations represent different intervals between successive movements of the contact 32c to its broken-line second position. For example, the graduations of the scale 41 may represent intervals of from 1 second to 60 seconds. Thus, if the index 40 is positioned to pinpoint that graduation which represents an interval of 60 seconds, each long exposure must be terminated within an interval of less than 1 minute (i.e., the contact 32c must be returned to the solid-line first position within a second interval which is shorter than the first interval selected by the adjusting knob 39) because the contact 32c is automatically moved to the broken-line second position at a frequency of 1 minute between the starts of successive long exposures. The pulse generator 36 can be any conventional adjustable timer which can furnish pulses at intervals selected by the adjusting knob 39. Such pulses cause short-lasting energization of the electromagnet which includes or controls the moving means 36a whereby the latter moves the contact 32c from the solid-line to the broken-line position.

The long exposures which are started by the pulse generator 36 at the preselected frequency can be terminated by hand (in that the user manually returns the contact 32c to the solid-line first position) or by a second pulse generator 43 which can comprise an electromagnet (not shown) having an armature 43a or analogous moving means for returning the contact 32c to the solid-line first position with a certain delay following the pivoting of contact 32c by the moving means 36a of the first pulse generator 36. In accordance with a presently preferred embodiment of the invention, the just mentioned delay will be a function of scene brightness. To this end, the pulse generator comprises an exposure control device having a photoelectric receiver 46 (preferably a resistor) which is exposed to scene light and causes the moving means 43a of the pulse generator 43 to return the movable contact 32c to the solid-line first position with a delay (following the movement of contact 32c to the broken-line second position in response to a pulse from the first generator 36) which depends on the intensity of scene light. The length of intervals determined by the second pulse generator 43 is shorter than that of the intervals between successive movements of the contact 32c to broken-line second position in response to pulses from the first generator 36. Thus, a pulse from the first generator 36 will cause the shutter 2 to rotate from the illustrated first angular position in which the blade 4 overlies the aperture 1 to the second angular position in which the unexposed film frame behind the aperture receives scene light, and a pulse from the generator 43 will thereupon cause the shutter 2 to return to the illustrated first angular position and to thus complete a long exposure. The pulse generator 43 is connected with the energy source 20 by two conductors 44 and 45.

The conductor 45 contains an auxiliary switch 47 which must be closed when the long exposures are started by the pulse generator 36 provided that such long exposures are to be terminated by the generator 43 rather than in response to manual movement of the contact 32c to its solid-line first position. The auxiliary switch 47 is normally open but is automatically closed by the shaft 5 when the shutter 2 assumes the second angular position in which the blade 4 does not overlie the light-admitting aperture 1. The operative connection 47a (indicated by a phantom line) between the movable contact of the auxiliary switch 47 and the shaft 5 (or another part of the shutter 2) preferably comprises a cam on the shaft 5 and a follower system which tracks the cam and closes the auxiliary switch 47 when the shutter 2 reaches the second angular position.

A conductor 49 which connects the conductors 38 and 45 with the one pole of the energy source 20 contains a normally open main switch 48 which must be closed by the user in order to connect the energy source 20 with the pulse generators 36 and 43. A detent structure (not shown) can be provided to hold the main switch 48 in the closed position at the will of the user The main switch 48 constitutes an actuating means for the pulse generator 36, i.e., the latter starts to furnish pulses at intervals selected by the adjusting knob 39 in immediate response to closing of the switch 48. This switch 48 (together with the parts 47, 47a) further constitutes an activating means for the pulse generator 43 because the latter automatically begins to furnish pulses at intervals determined by the photosensitive receiver 46 when the switch 48 is closed.

In order to make a series of long exposures with the help of the pulse generators 36 and 43, the user of the camera first selects the frequency at which the pulse generator 36 should move the contact 32c of the two-way switch 32 to the broken-line second position. This is achieved by rotating the adjusting knob 39 until the index 40 registers with a selected graduation on the scale 41. Such frequency will be selected by full consideration of the prevailing or anticipated scene brightness, i.e., the user should set the adjusting knob 39 in such a way that the longest anticipated exposure time will be shorter than the intervals between successive automatic movements of the contact 32c to its broken-line second position. In the next step, the user closes the main switch 48 so that the pulse generators 36 and 43 are connected in circuit with the energy source 20. The shutter 2 is assumed to dwell in the illustrated first angular position and the contact 32c is assumed to engage the stationary contact 32a of the two-way switch 32. The first pulse furnished by the generator 36 on closing of the main switch 48 causes the moving means 36a to move the contact 32c into engagement with the contact 32b so that the electromagnet 14 is energized by way of the fixed contacts 28, 34 and contact plate 24 whereby the tooth 12 is caused to leave the path of the projections 7, 8 and the motor 6 is started by the switch 18. The shutter 2 rotates through about 180° and is arrested by the tooth 12 when the insulator 26 reaches the fixed contact 28. Such angular movement of the shutter 2 resulted in the transport of motion picture film by the length of a frame and the first long exposure begins when the projection 8 is arrested by the tooth 12 because the blade 4 is then out of register with the light-admitting aperture 1 which is located in front of the foremost unexposed film frame.

The auxiliary switch 47 is closed by the shaft 5 and operative connection 47a not later than when the shutter 2 reaches its second angular position. Therefore, the exposure control device of the pulse generator 43 (including the photoelectric receiver 46) is set in operation and the electromagnet of this pulse generator causes the moving means 43a to return the contact 32c into engagement with the contact 32a with a delay which is a function of scene brightness. The circuit of the electromagnet 14 is then completed by way of the fixed contacts 27, 34 and contact plate 24 so that the shutter 2 rotates to return to the illustrated first angular position in which the tooth 12 is engaged by the surface 7a of the projection 7 prior to elapse of the interval which is selected by the adjusting knob 39. The shutter 2 then remains in the illustrated first angular position until the contact 32c reengages the contact 32b in response to a second pulse from the pulse generator 36. This starts the making of the second long exposure and such exposure is completed in response to a pulse from the generator 43 with a delay which is a function of scene brightness and which may but need not be identical with the delay required for the generation of the first pulse which has caused the contact 32c to engage the contact 32a.

If the pulse generator 36 is adjusted to furnish pulses at a 60-second frequency and if the average delay with which the generator 43 furnishes a pulse following a movement of the shutter 2 to its second angular position is 2 seconds, the length of time between successive long exposures will average 58 seconds. This is often desirable, particularly if the prevailing scene brightness is likely to vary within a wide range so that one can anticipate the making of very long exposures (e.g., up to but less than 60 seconds) or the making of relatively short long exposures (such as 1, 2 or 3 seconds). If the user is reasonably certain that the longest long exposure will not exceed 10 seconds, the position of the adjusting knob 39 may be changed, for example, in such a way that the generator 36 will furnish pulses at 15-second intervals.

It will be noted that the pulses furnished by the pulse generators 36, 43 respectively serve to energize the electromagnet 14 at preselected first intervals (depending on the selected setting of the adjusting knob 39) and at second intervals each of which begins when the shutter 2 completes its movement to the second angular position in response to a pulse from the pulse generator 36 and is terminated with a delay which is determined by the exposure control device including the photosensitive receiver 46. Each such energization of the electromagnet 14 results in a movement of the intercepting lever 9 to its inoperative position so that the shutter 2 is free to rotate and is immediately caused to rotate by the drive means 6, 6a whose motor is started by the switch 18 as soon as the intercepting lever 9 moves to its inoperative position.

The control unit which includes the elements 24–28 and 32 can be said to further include the electromagnet 14 because this electromagnet is energized to release the shutter 2 for rotation under the action of the drive means 6, 6a whenever the control unit completes one of its two circuits, namely, the circuit including the fixed contact 27 or the circuit including the fixed contact 28.

An important advantage of the improved motion picture camera over the heretofore known cameras which are designed to take pictures with long exposure times is that the intervals during which successive film frames are exposed to scene light during the making of long exposures can vary within a wide range while the frequency at which the film is being transported remains unchanged. This renders it possible to operate the improved camera in the aforedescribed manner, namely, that the pulse generator 36 effects rotation of the shutter 2 from the first to the second angular position at relatively long intervals whereas the pulse generator 43 causes the shutter to reassume its first position with variable delays following successive movements of the shutter to its second position, as long as each such delay is shorter than the length of intervals between successive movements of the contact 32c from the solid-line to the broken-line position. Such mode of operation of the camera during the making of long exposures insures that the frequency of film transport remains constant even though the length of exposure times for the taking of successive pictures is much shorter than the length of intervals determined by the pulse generator 36 and even though the length of such exposure times varies within a very wide range. Consequently, the speed at which the object on a screen or the like appears to move is invariably proportional to actual speed of the object during the making of long exposures. This will be readily understood if one considers that the film is always advanced by increments of identical length.

The provision of the second pulse generator 43 exhibits the additional important advantage that an inexperienced photographer is not compelled to estimate the optimum exposure times for long exposures. This is achieved by the provision of the operative connection 47a and switch 47 which is closed in automatic response to each movement of the shutter 2 to its second position and also by the provision of the exposure control device including the photosensitive receiver 46 which insures that the length of exposure times during the making of long exposures is dependent on the intensity of scene light.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In a motion picture camera for the making of exposures with relatively short exposure times of predetermined duration and longer exposure times of variable length, a combination comprising means defining a light-admitting aperture; a shutter having blade means and being movable between and beyond first and second positions in which said blade means respectively overlies and is out of register with said aperture; drive means for said shutter; first pulse generator means actuatable to effect movement of said shutter from said first to said second position at predetermined first intervals; and second pulse generator means actuatable to effect movements of said shutter from said second position back to said first position at variable second intervals each of which is shorter than one of said first intervals so that said shutter reassumes said first position prior to elapse of each first interval.

2. A combination as defined in claim 1, further comprising means for actuating said first pulse generator means at the will of the user.

3. A combination as defined in claim 1, wherein said second pulse generator means includes exposure control means having photosensitive means for determining the length of said second intervals as a function of scene brightness.

4. A combination as defined in claim 3, further comprising means for actuating said second pulse generator means in response to movement of said shutter to said second position so that each of said second intervals begins when said blade means is out of register with said aperture.

5. A combination as defined in claim 4, further comprising intercepting means movable between operative and inoperative positions in which a portion thereof respectively extends into and is withdrawn from the path of movement of a portion of said shutter so that the shutter is arrested in response to movement of said interceptiong means to said operative position and said drive means is free to move said shutter in response to movement of said interceptiong means to said inoperative position, said second pulse generator means further comprising means for effecting a movement of said intercepting means to said inoperative position after the elapse of said second intervals.

6. A combination as defined in claim 1, further comprising intercepting means movable to and from an operative position in which a portion thereof arrests said shutter to one of said first and second positions, and displacing means including electromagnet means energizable to move said intercepting means from said operative position.

7. A combination as defined in claim 6, wherein said first and second pulse generator means are respectively arranged to energize said electromagnet means after the elapse of said first and second intervals.

8. A combination as defined in claim 1, further comprising control means for respectively arresting said shutter in said second and first positions upon actuation of said first and second pulse generator means, said control means comprising multi-way switch means having a portion movable from a first to a second position to thereby complete a first circuit until said shutter reaches said second position, said portion of said switch means being further movable from said second to said first position to thereby complete a second circuit until said shutter reaches said first position, said first and second pulse generator means respectively comprising first and second moving means for respectively moving said portion of said switch means to said second and first positions after elapse of each of said first and second intervals.

9. A combination as defined in claim 8, wherein said circuits include common means for releasing said shutter to the action of said drive means in response to completion of either circuit.

10. A combination as defined in claim 1, further comprising adjustment means for varying the length of said first intervals.

11. A combination as defined in claim 1, further comprising means for starting said drive means in response to each actuation of said first and second pulse generator means.

12. A combination as defined in claim 1, further comprising means for arresting said drive means in response to completion of each movement of said shutter to said second and first positions thereof on actuation of said first and second pulse generator means.

* * * * *